(12) United States Patent
Kojima et al.

(10) Patent No.: US 6,612,931 B2
(45) Date of Patent: Sep. 2, 2003

(54) GAME SYSTEM PROVIDED WITH MESSAGE EXCHANGE FUNCTION, GAME APPARATUS USED IN THE GAME SYSTEM, MESSAGE EXCHANGE SYSTEM, AND COMPUTER READABLE STORAGE MEDIUM

(75) Inventors: Hideo Kojima, Tokyo (JP); Noriaki Okamura, Tokyo (JP); Shuyou Murata, Tokyo (JP)

(73) Assignee: Konami Corporation, Tokyo (JP)

( * ) Notice: Subject to any disclaimer, the term of this patent is extended or adjusted under 35 U.S.C. 154(b) by 134 days.

(21) Appl. No.: 09/804,514

(22) Filed: Mar. 12, 2001

(65) Prior Publication Data

US 2002/0025853 A1 Feb. 28, 2002

(30) Foreign Application Priority Data

Mar. 15, 2000 (JP) ..................... P2000-077847

(51) Int. Cl.⁷ .............................. A63F 13/12; A63F 3/00
(52) U.S. Cl. .............................. 463/42; 463/40; 463/19
(58) Field of Search .............................. 463/40, 42, 19, 463/18, 28, 31; 273/157 R; 283/114; 345/716

(56) References Cited

U.S. PATENT DOCUMENTS

| 4,445,187 A | * | 4/1984 | Best ............................. 463/31 |
| 4,569,026 A | * | 2/1986 | Best ............................. 345/716 |
| 5,377,997 A |  | 1/1995 | Wilden et al. |
| 5,935,002 A | * | 8/1999 | Falciglia ..................... 463/19 |
| 5,942,969 A |  | 8/1999 | Wicks |
| 6,094,483 A | * | 7/2000 | Fridrich et al. ............... 380/28 |
| 6,336,631 B1 | * | 1/2002 | Volkert ................... 273/157 R |
| 6,354,631 B1 | * | 3/2002 | Jackson ...................... 283/114 |

FOREIGN PATENT DOCUMENTS

| EP | 0 974 382 |   | 1/2000 |   |
| GB | 2305770 A | * | 4/1997 |   |
| GB | 2309415 A | * | 7/1997 |   |
| GB | 2318086 A | * | 4/1998 |   |
| GB | 2 344 539 |   | 6/2000 |   |
| WO | WO 99/15249 |   | 4/1999 |   |
| WO | WO 99/24900 |   | 5/1999 |   |
| WO | WO-01/88665 A2 | * | 11/2000 |   |
| WO | WO-01/45025 A1 | * | 6/2001 | ........... G06F/19/00 |
| WO | WO-02/37208 A2 | * | 5/2002 |   |

\* cited by examiner

*Primary Examiner*—Jessica Harrison
*Assistant Examiner*—Yveste Cherubin
(74) *Attorney, Agent, or Firm*—Jordan and Hamburg LLP

(57) ABSTRACT

A game system capable of message exchange taking profit of functions proper to the game machine is achieved by a game system, comprising a first game apparatus 1 including a message creation device 4, 10 and a device 10 for transmitting the created message, and a second game apparatus 1 including a reception device 10 of said message and a display control device 10 for displaying the received message on the screen of a predetermined display apparatus 3, wherein said second game apparatus 1 includes a game execution device 10 for making a user to play a predetermined game, and a display permission control device 10 for prohibiting to display at least a part of said message until a predetermined condition is met in said game, and allowing to display the display prohibited part of said message when said condition is met.

30 Claims, 14 Drawing Sheets

FIG. 3
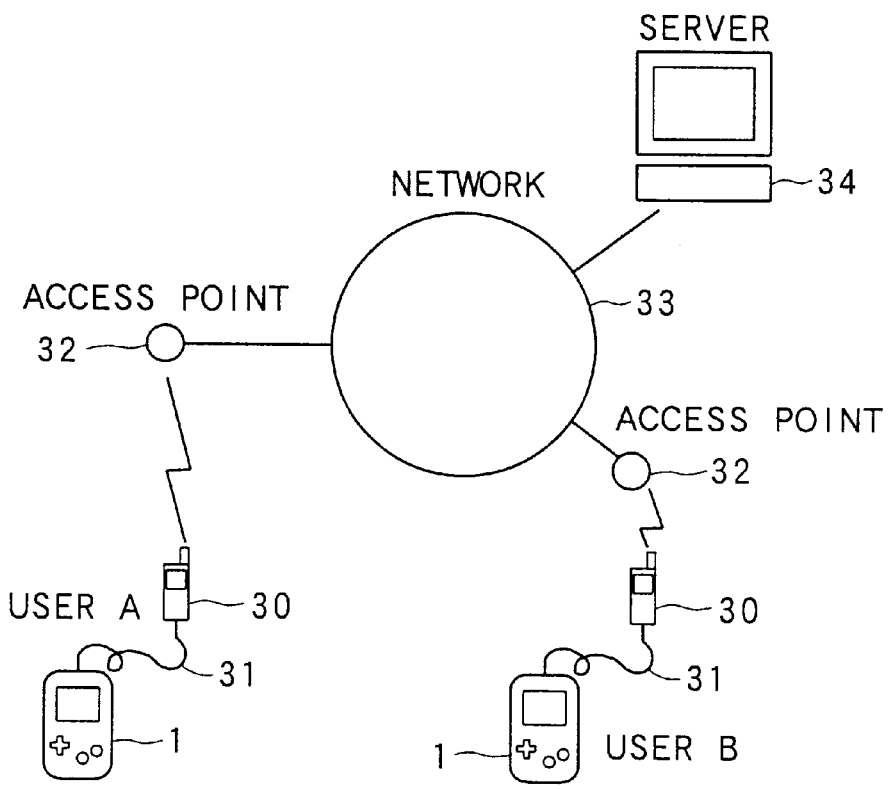
(a)
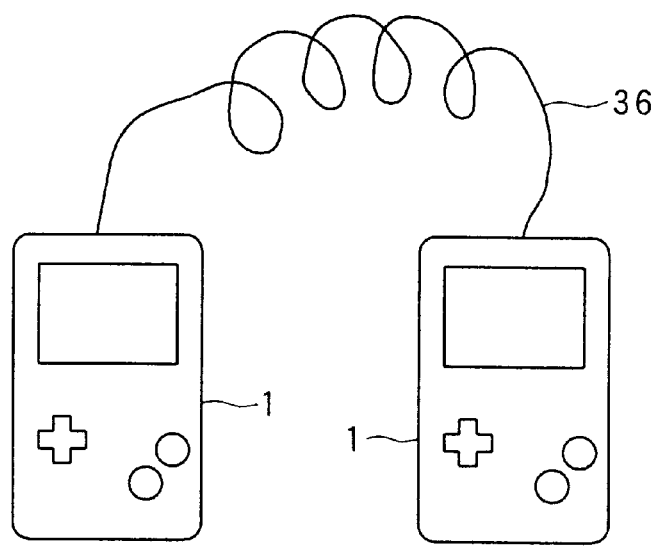
(b)

FIG. 7
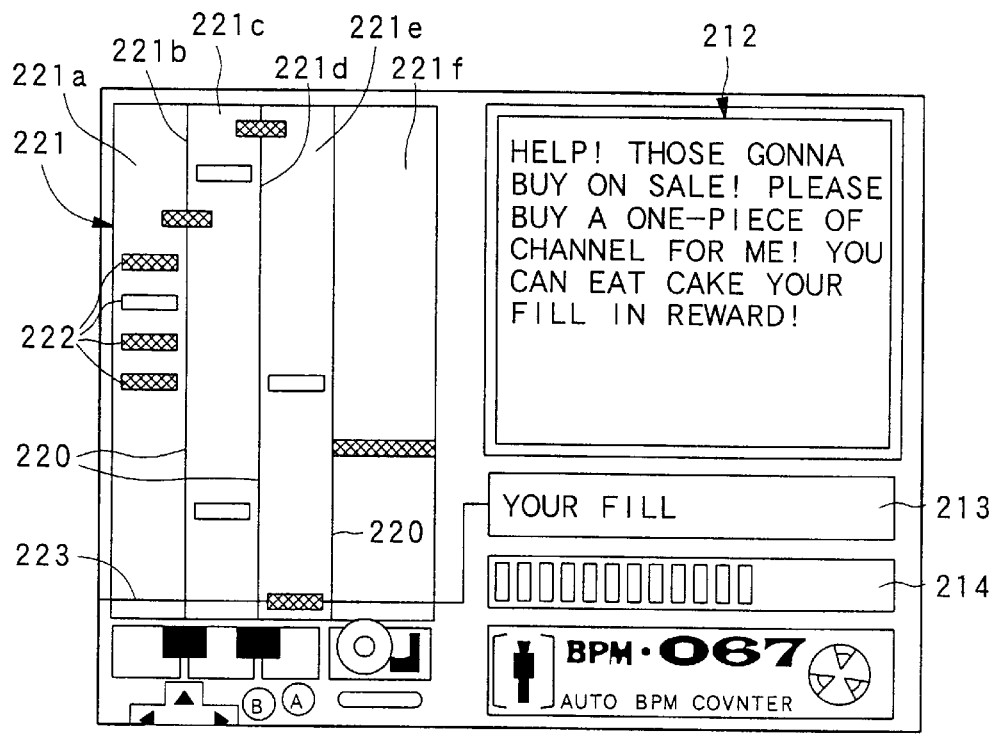
(B)
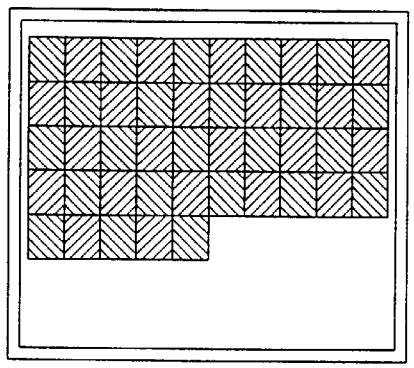
(C)
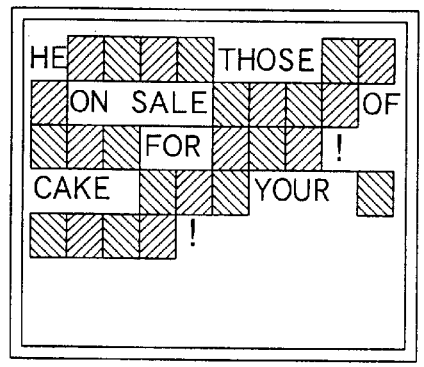

FIG. 9
(A)
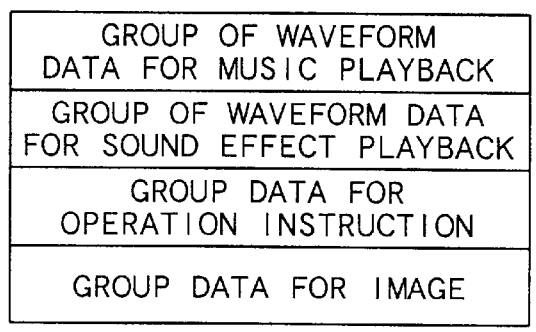
(B)
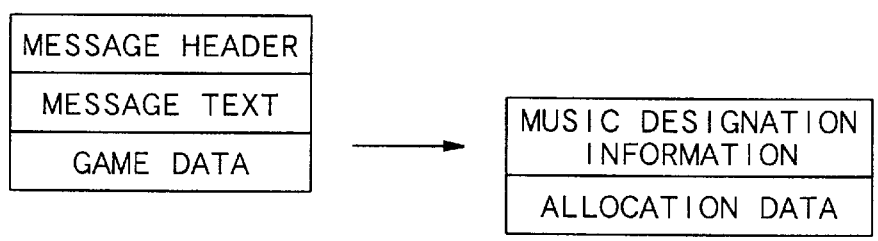

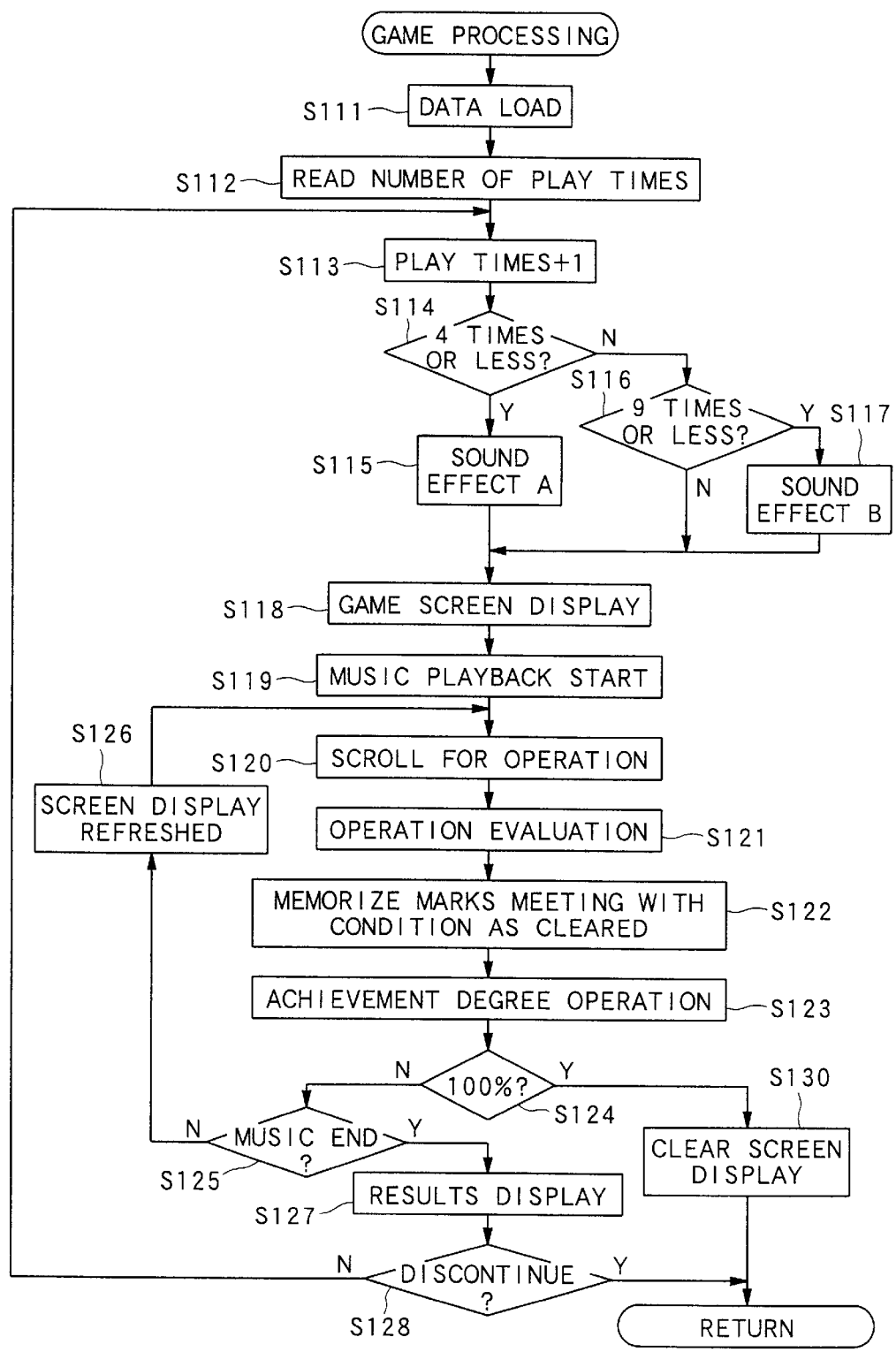

GAME SYSTEM PROVIDED WITH MESSAGE EXCHANGE FUNCTION, GAME APPARATUS USED IN THE GAME SYSTEM, MESSAGE EXCHANGE SYSTEM, AND COMPUTER READABLE STORAGE MEDIUM

FIELD OF THE INVENTION

The present invention relates to a game system provided with a message exchange function.

DESCRIPTION OF THE RELATED ART

In recent years, many game machines are provided with a communication function, and a variety of game softwares capable of exchanging data or playing match-up games by utilizing this communication function are offered.

However, the conventional game machines have been positioned as a simple network terminal cheaper than the personal computer, that can be operated without special knowledge, and characteristics as a game machine have not been utilized sufficiently.

SUMMARY OF THE INVENTION

Therefore, it is an object of the present invention to provide a game system and a message exchange system capable of message exchange taking profit of functions proper to the game machine, and a computer readable storage medium appropriate for them.

Now, the present invention will be described. Reference numbers in the attached drawing will be added between parentheses to facilitate the understanding of the invention; however the invention is not limited to the illustrated embodiment thereby.

According to one aspect of the present invention, there is provided a game system comprising: a first game apparatus (1) including a device for creating a message (4, 10) and a device (10) for transmitting the created message; and a second game apparatus (1) including a reception device (10) of said message and a display control device (10) for displaying the received message on a screen of a predetermined display apparatus (3), wherein said second game apparatus includes a game execution device (10) for making a user play a predetermined game, and a display permission control device (10) for prohibiting to display at least a part of said message until a predetermined condition is met in said game, and permitting to display the prohibited part of said message when said condition is met.

According to this game system, at least a part of a received message is not displayed, unless the message receiver plays a predetermined game and a predetermined condition is satisfied. This allows to add an entertainment to the message reading, and to enjoy exchanging message compared to the case of simple message exchange. In addition, even when a same game is repeated, the message displayed as a result of playing is different each time, preventing the user from losing interest in the repetition of the game, maintaining the charm of the game for a long time.

In the above described game system, said display permission control device may expand the display permitted range of said message as said game progresses. In this way, the message contents is revealed progressively as the game progresses, allowing to maintain the interest of the receiving user securely.

Said second game apparatus may comprise a music reproduction device (10, 7) for selecting and reproducing any one piece of music among a plurality of pieces of music prepared beforehand, said game execution device (10) is composed to make the user play a game requiring an operation related to the piece of music to be reproduced by said music reproduction device, and said first game apparatus is provided with a music designation device (10) for designating the piece of music to be reproduced by said music reproduction device of said second game apparatus in relation to said message.

According to this game system, as the sender can designate the piece of music to be used in the reception side game, the message can include information that can not be transferred only by characters by designating a piece of music appropriate for the message contents or the feeling at the time of transmission.

The game execution device of said second game apparatus may comprise, an operation instruction device (10, 3) showing a series of operations to an input device provided in said second game apparatus to the user through the screen of said display apparatus, based on operation instruction data prepared beforehand, and an evaluation device (10) for evaluating each one of said series of operations, based on the level of agreement of each one of the series of operations designated by said operation instruction device, and individual operation actually performed by the user to said input apparatus, a correspondence is established between each one of said series of operations and each character of said message, and said display permission control device permits to display the character corresponding to the operation to which an evaluation equal or superior to a predetermined level is afforded by said evaluation device, and prohibits to display the character corresponding to the operation to which an evaluation inferior to said predetermined level is afforded by said evaluation device.

According to this game system, when the user follows exactly each one of the series of operations designated through the screen of the display apparatus, an evaluation equal or superior to the predetermined level is afforded to the operations, and characters related to the operations are displayed as a reward. Accordingly, the condition for displaying the message is easy to understand for the user.

Said first game apparatus may be provided with a device (10, 4) for creating data designating the correspondence between each one of said series of operations and each character of said message, said message transmission device is capable of transmitting said data designating the correspondence along with said message, and said reception device of said second game apparatus can receive said data designating the correspondence with said message.

According to this case, as data designating the correspondence between each character of said message and the operations in a game is created by message transmission side, the reception side is required only to play the game based on the data.

Said device for creating data designating the correspondence may comprise an operation selection device (10) for selecting an operation as an object to be allocated with a character from each one of the series of operations defined by said operation instruction data, based on the instruction by said user; and an allocation character decision device (10) for deciding at least one character to be allocated from said created message to the operation selected by said operation selection device based on the instruction by the user. According to this invention, the user as a sender can define said correspondence at their own discretion.

Said device for creating data designating the correspondence may comprise a character extraction device (10) for extracting automatically at least one character from said created message independently of the instruction by the user, and an operation selection device (10) for selecting automatically an operation to which said extracted character is to be allocated from each one of the series of operations defined by said operation instruction data independently of the instruction by the user. According to this embodiment, said correspondence is created automatically without user's instruction.

Said second game apparatus may be provided with a device for creating data designating the correspondence between each one of said series of operations and each character of said message, said device for creating data designating the correspondence comprises: a character extraction device (10) for extracting automatically at least one character from said created message independently of the instruction by the user, and an operation selection device (10) for selecting automatically an operation to which said extracted character is to be allocated from each one of the series of operations defined by said operation instruction data independently of the instruction by the user. In this case, said correspondence is set according to the message received by the second game apparatus side. Consequently, the sender is not required to take the correspondence into the consideration.

Said second game apparatus may comprise a music reproduction device (10,7) for selecting and reproducing any one piece of music among a plurality of pieces of music prepared beforehand, and operation instruction data is created individually for each one of said plurality of pieces of music. According to this case, one can enjoy the game attuning a piece of music.

Said first game apparatus may be provided with a music designation device (10) for designating the piece of music to be reproduced by said music reproduction device of said second game apparatus in relation to said message. Consequently, the message sender can designate by themselves a piece of music according to the message contents or their feelings at the moment of transmission.

Said second game apparatus may allow to execute said game within a predetermined play range until said message becomes a predetermined display status. Consequently, even when a message can not be read within a single game, the message can be read by playing the game repeatedly.

Said second game apparatus may allow to execute said game within a predetermined play range until said message becomes a predetermined display status, and in the second game and thereafter, said operation instruction device instructs to the user those operations to which an evaluation equal or superior to said predetermined level was afforded in the past games and those operations to which an evaluation equal or superior to said predetermined level was not afforded in different forms.

According to this case, in the second game and thereafter, as those operations to which an evaluation equal or superior to said predetermined level was already afforded and those operations not afforded can be distinguished, the user can play the game concentrating their attention on those operations to which an evaluation equal or superior to said predetermined level is not afforded.

According to another aspect of the present invention, there is provided a game apparatus allowing to exchange message, comprising: an input apparatus (4) for outputting a signal corresponding to the user operation; a display apparatus (3) allowing to display a predetermined game screen (210); a reception device (10) for receiving an external message; a display control device (10) for displaying the received message on the screen of said display apparatus; a game execution device (10) for making a user play a predetermined game through said game screen, and a display permission control device (10) for prohibiting to display at least a part of said message until a predetermined condition is met in said game, and allowing to display the prohibited part of said message when said condition is met. According to this invention, a game apparatus appropriate for the game system of claim 1 can be provided.

Said display permission control device may expand the display permitted range of said message as said game progresses.

The game apparatus may further comprise a music reproduction device for selecting and reproducing any one piece of music among a plurality of pieces of music prepared beforehand, wherein said game execution device is composed to make the user play a game related to the piece of music to be reproduced by said music reproduction device, said reception device can receive information designating the piece of music to be reproduced by said music reproduction device in relation to said message, and said music reproduction device reproduces the piece of music designated in relation to the message, when a game corresponding to said received message is executed.

Said game execution device may comprise: an operation instruction device (10) showing a series of operations to an input device provided in said second game apparatus to the user through the screen of said display apparatus, based on operation instruction data prepared beforehand; and an evaluation device (10) for evaluating each one of said series of operations, based on the level of agreement of each one of the series of operations designated by said operation instruction device, and individual operation actually performed by the user to said input apparatus, a correspondence is established between each one of said series of operations and each character of said message, and said display permission control device permits to display the character corresponding to the operation to which an evaluation equal or superior to said predetermined level is afforded by said evaluation device, and prohibits to display the character corresponding to the operation to which an evaluation inferior to said predetermined level is afforded by said evaluation device.

The game apparatus may receive said data designating the correspondence between each one of said series of operations and each character of said message from outside with said message, and said display permission control device controls permission and prohibition of said display based on the data designating said correspondence.

The game apparatus may comprise as a device for creating data designating the correspondence between each one of said series of operations and each character of said message: a character extraction device (10) for extracting automatically at least one character from said received message independently of the instruction by the user; and an operation selection device (10) for selecting automatically an operation to which said extracted character is to be allocated from each one of the series of operations defined by said operation instruction data independently of the instruction by the user.

The game apparatus may be capable of executing said game within a predetermined play range until said message becomes a predetermined display status.

The game apparatus,may be capable of executing said game within a predetermined play range until said message becomes a predetermined display status, wherein in the second game and thereafter, said operation instruction device instructs to the user those operations to which an evaluation equal or superior to said predetermined level was afforded in the past games and those operations to which an evaluation equal or superior to said predetermined level was not afforded in different forms.

According to still another aspect of the present invention, there is provided a message exchange system comprising a first terminal apparatus (1) including a device for creating a message (4, 10) and a device (10) for transmitting the created message; and a second terminal apparatus (1) including a reception device of said message (10) and a display control device (10) for displaying the received message on the screen of a predetermined display apparatus (3), wherein said second terminal apparatus includes a game execution device (10) for making a user play a predetermined game, and a display permission control device (10) for prohibiting to display at least a part of said message until a predetermined condition is met in said game, and allowing to display the display prohibited part of said message when said condition is met.

According to this message exchange system, similarly to the above described game system, at least a part of received message is not displayed unless the message receiver plays a predetermined game and a predetermined condition is satisfied. This allows to add an entertainment to the message reading, and to enjoy exchanging message compared to the case of simple message exchange. In addition, even when a same game is repeated, message displayed as a result of playing is different each time, preventing the user from losing interest in the repetition of game, maintaining the charm of the game for a long time.

According to still another aspect of the present invention, there is provided a computer readable storage medium (17) storing a program for making a computer (10) provided in a game apparatus (1) function as a reception device for receiving an external message, a display control device for displaying the received message on the screen of a predetermined display apparatus (3), a game execution device for making a user to play a predetermined game through the screen of said display apparatus, and a display permission control device for prohibiting to display at least a part of said message until a predetermined condition is met in said game, and allowing to display the prohibited part of said message when said condition is met. According to this storage medium, it is possible to provide the above described game apparatus by reading the program stored in the storage medium by a computer and executing it.

In the storage medium of the present invention, the following features can be added.

Said display permission control device may expand the display permitted range of said message as said game progresses.

Said program may be composed to make said computer (10) function as a device for selecting any one piece of music among a plurality of pieces of music prepared beforehand and making it reproduced by a reproduction apparatus (7) of the game apparatus, said game execution device may composed to make the user execute an operation related to the piece of music to be reproduced by said reproduction apparatus, and said reception device can receive information designating the piece of music to be reproduced by said music reproduction device in relation to said message along with said massage, and said device for reproducing may make the piece of music designated in relation to the message be reproduced, when a game corresponding to said received message is executed.

Said game execution device may comprise an operation instruction device showing a series of operations to said input device to the user through the screen of said display apparatus, based on operation instruction data prepared beforehand, and an evaluation device for evaluating each one of said series of operations, based on the level of agreement of each one of the series of operations designated by said operation instruction device, and individual operations actually performed by the user to said input apparatus, a correspondence may be established between each one of said series of operations and each character of said message, and said display permission control device may permit to display the character corresponding to the operation to which an evaluation equal or superior to said predetermined level is afforded by said evaluation device, and prohibits to display the character corresponding to the operation to which an evaluation inferior to said predetermined level is afforded by said evaluation device.

Said reception device can receive said data designating the correspondence between each one of said series of operations and each character of said message from outside with said message, and said display permission control device may control permission and prohibition of said display based on the data designating said correspondence.

Said program may composed to make said computer function as a device for creating data designating the correspondence between each one of said series of operations and each character of said message, said device for creating data may comprise a character extraction device for extracting automatically at least one character from said created message independently of the instruction by the user, and an operation selection device for selecting automatically an operation to which said extracted character is to be allocated from each one of the series of operations defined by said operation instruction data independently of the instruction by the user.

Said program may be composed to permit to repeat said game within a predetermined play range until said message becomes a predetermined display status.

Said program may be composed to permit to repeat said game within a predetermined play range until said message becomes a predetermined display status, and in the second game and thereafter, said operation instruction device may instruct to the user those operations to which an evaluation equal or superior to said predetermined level was afforded in the past games and those operations to which an evaluation equal or superior to said predetermined level was not afforded indifferent forms.

According to still another aspect of the present invention, there is provided a computer readable storage medium (17) storing respectively a program for making a computer (10) provided in a game apparatus (1) function as a message transmission apparatus, and a program for making the computer function as a reception apparatus for receiving said external message, wherein said program for making said computer function as a transmission apparatus is composed to make the computer function as a message creation device and a device for transmitting the created message respectively, and said program for making said computer function as a receiving apparatus is composed to make said computer function as a reception device for receiving an external message, a display control device for displaying the received message on the screen of a predetermined display apparatus, a game execution device for making a user to play a predetermined game through the screen of said display apparatus, and a display permission control device for prohibiting to display at least a part of said message until a predetermined condition is met in said game, and allowing to display the prohibited part of said message when said condition is met.

According to this storage medium, a game machine can function either as the first game apparatus or as the second game apparatus of the above described game system.

In the aforementioned invention, the storage device and the storage medium include magnetic storage medium such as hard disk storage device, floppy disk storage device or others, optical storage medium or photo-magnetic storage medium such as CD-ROM, semiconductor storage medium such as RAM and RM, and various other storage media. The musical direction in the present invention includes not only acts to add directional effect by sound or light to a completed piece of music, but also an act to complete a piece of music by a player playing a part of the piece of music.

BRIEF DESCRIPTION OF THE DRAWINGS

Exemplary embodiments of the invention will now be described in conjunction with the drawings in which:

FIGS. 3(a) and 3(b) show a connection configuration in the case where message is exchanged by connecting the game machine of FIG. 1 to another one.

FIGS. 7(a), 7(b) and 7(c) show a game screen appearing after the screen of FIG. 6.

FIGS. 9(a) and 9(b) show the structure of data stored previously in an external storage apparatus for realizing the message exchange function by the game machine of FIG. 1 and transmission data comprising a message.

FIG. 14 is a flow chart showing the procedures of a game processing to be performed for displaying a received message.

DETAILED DESCRIPTION OF THE PREFERRED EMBODIMENT

Embodiments of the present invention will now be described in detail with reference to the drawings.

Figure 1:
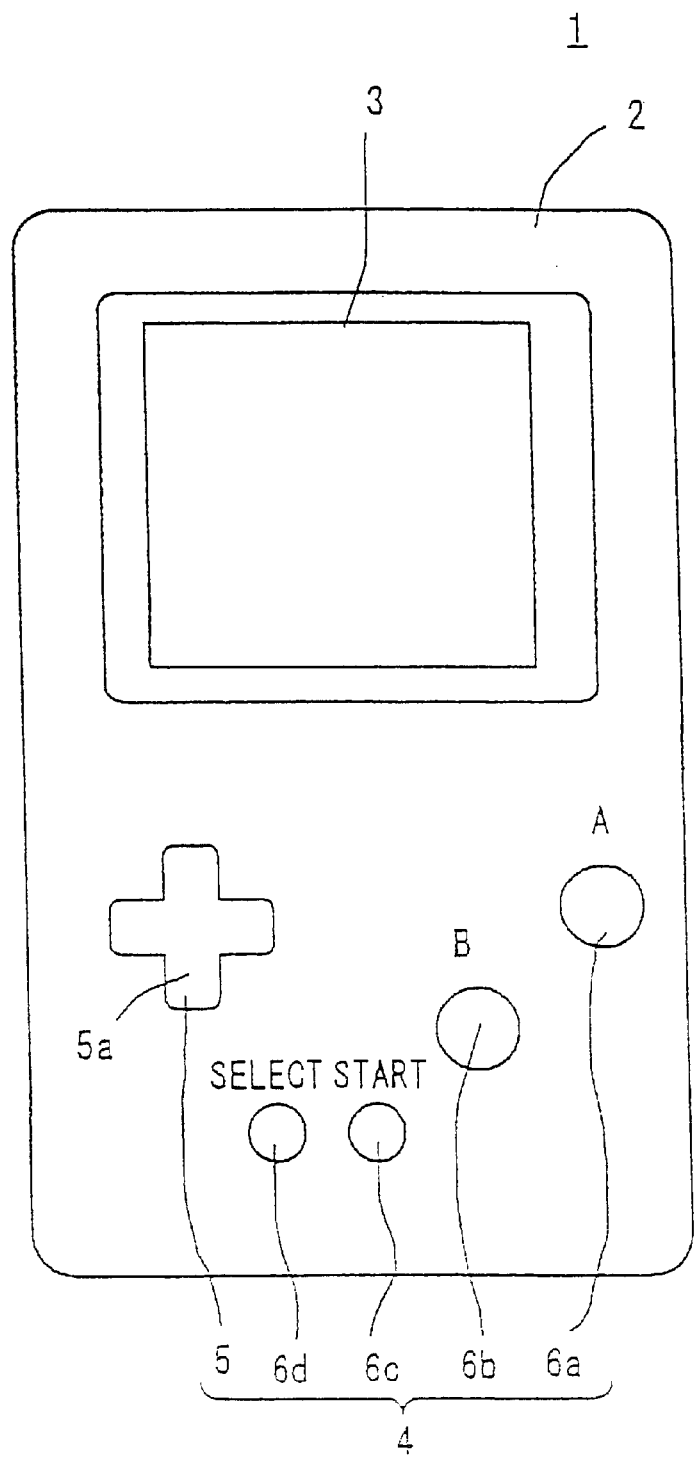
FIG. 1 is a front view of a portable game machine as game apparatus composing a game system of present invention.

FIG. 1 shows a portable game machine, as a game apparatus composing the game system of the present invention. The portable game machine 1 comprises a body 2, a liquid crystal monitor 3 as display apparatus attached to this body 2, and an input apparatus 4. The input apparatus 4 is provided with a direction indication switch 5 and a plurality of push-button switches 6a to 6d. The direction indication switch 5 having a cruciform, for example, operation member 5a, outputs a signal corresponding to the vertical and horizontal operations (pressing operation of upper and lower edges, right and left edges) of this operation member 5a. The composition of such input apparatus 4 being well-known, various modifications may be devised. For example, in place of operation member 5a, one push-button switch may be disposed respectively upward, downward, right and left. Although the number and disposition of push-button switches 6a to 6d may be modified variously, in the following description, the push-button switch 6a shall be call A button, push-button switch 6b B button, push-button switch 6c START button, and push-button switch 6d SELECT button. However, when there is no need to distinguish these buttons, they shall be called push-button switch 6. In addition, the game machine 1 comprises a power switch, operation members for sound volume adjustment, or others, but they are omitted.

Figure 2:
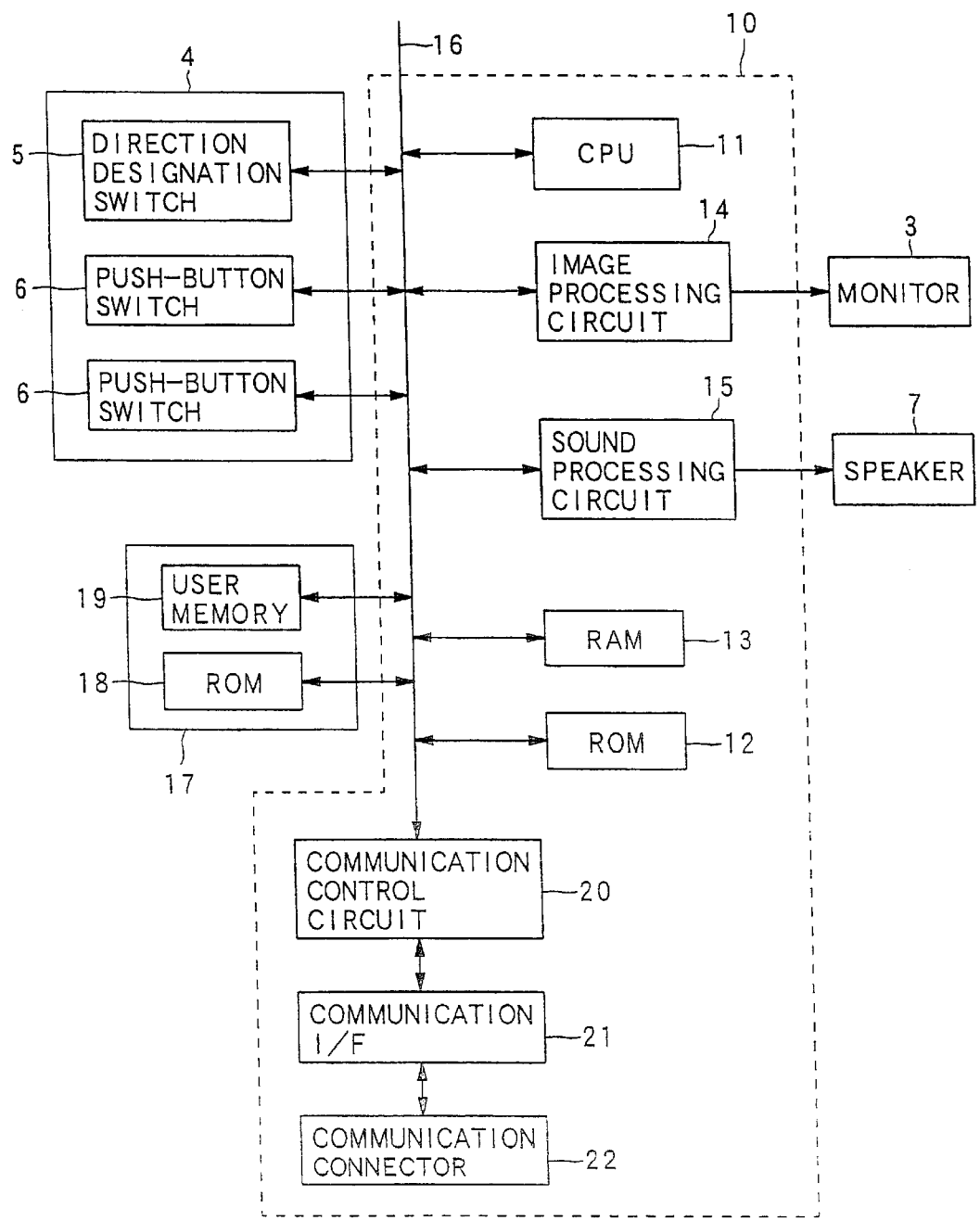
FIG. 2 is a functional block diagram of a control system of the game machine of FIG. 1.

FIG. 2 shows the composition of a control apparatus 10 disposed in the game machine 1. The control apparatus 10 is composed as a computer essentially made of a CPU 11 using a microprocessor. To the CPU 11, a ROM 12 and a RAM 13 as main storage apparatus, an image processing circuit 14 and a sound processing circuit 15 are connected respectively through a bus 16. The ROM 12 stores programs necessary for basic control (for example, start processing) of the game machine 1. A work area for the CPU. 11 is secured in the RAM 13. The image processing circuit 14 controls the liquid crystal monitor 3 according to the drawing directions from the CPU 11, and displays a predetermined image on its screen. The sound processing circuit 15 generates analog sound signals according to the pronunciation directions from the CPU 11 and outputs to the speaker 7.

Respective switches 5, 6 of the input apparatus 4 are connected to the CPU 11 through the bus 16, allowing the CPU 11 to distinguish the operation status of respective switches 5, 6. An external storage apparatus 17 separate from the control apparatus 10 is connected to a bus 16. The external storage apparatus 17 is composed of, for example, a cassette attachable to and detachable from the body 2, and provided with a ROM 18 as storage medium and a user memory 19 therein. Programs to make the control apparatus 10 function as respective devices of the present invention and various data required for the execution thereof are recorded beforehand in the ROM 18. A rewritable ROM such as flash memory is used for the memory 19, and game save data or the like, for example, are recorded therein as necessary. The storage medium of the external storage apparatus 17 is not limited to the semiconductor memory element, but magnetic storage medium, optical storage medium, photo-magnetic storage medium, or various storage media may be used. An interface circuit is interposed between the bus 16 and respective elements as necessary, but they are not illustrated. The control apparatus 10 is not limited to the foregoing, but various control apparatuses may be used.

The CPU 11 is connected to a communication control circuit 20 through the bus 16, in order to connect the game machine 1 to a predetermined communication circuit or other game machines or the like. The communication control circuit 20 is connected to a communication connector 22 through a communication interface 21. As communication control circuit 20, for example, a combination of DSP (digital signal processor) and software, serving as modem or network interface, can be used. The communication connector 22 or an interface 21 may be provided as external connection peripheral to the game machine 1.

In the game machine 1 of the aforementioned composition, games of various genres can be played on the screen of the monitor 3 by loading programs recorded in the ROM 18 of the external storage apparatus 17 into the RAM 13 and executing by the CPU 11. In addition, message can be exchanged with another game machine 1, by connecting the game machine 1 to a predetermined network by controlling the communication control circuit 20. The network connection can be realized, for example, in a form shown in FIG. 3(a). In this example, the game machine 1 works as network terminal, by connecting a mobile communication terminal telephone 30 such as cellular phone or PHS (represented by cellular phone, hereinafter) and the communication connector 22 of the game machine 1 with a communication cable 31, calling a predetermined access point 32 by controlling the cellular phone 30 from the game machine 1 and connecting to a server 34 through a predetermined network 33 from the access point 32. However, the game system of the present invention is not limited to such message exchange through network, but the connection between game machines 1 may be realized in various forms. For instance, as shown in FIG. 3(b), message can be exchanged between game machines 1 by connecting them 1 through a communication cable 36. Game machines 1 may also be connected by wireless communication using infrared or the like.

Figure 4:
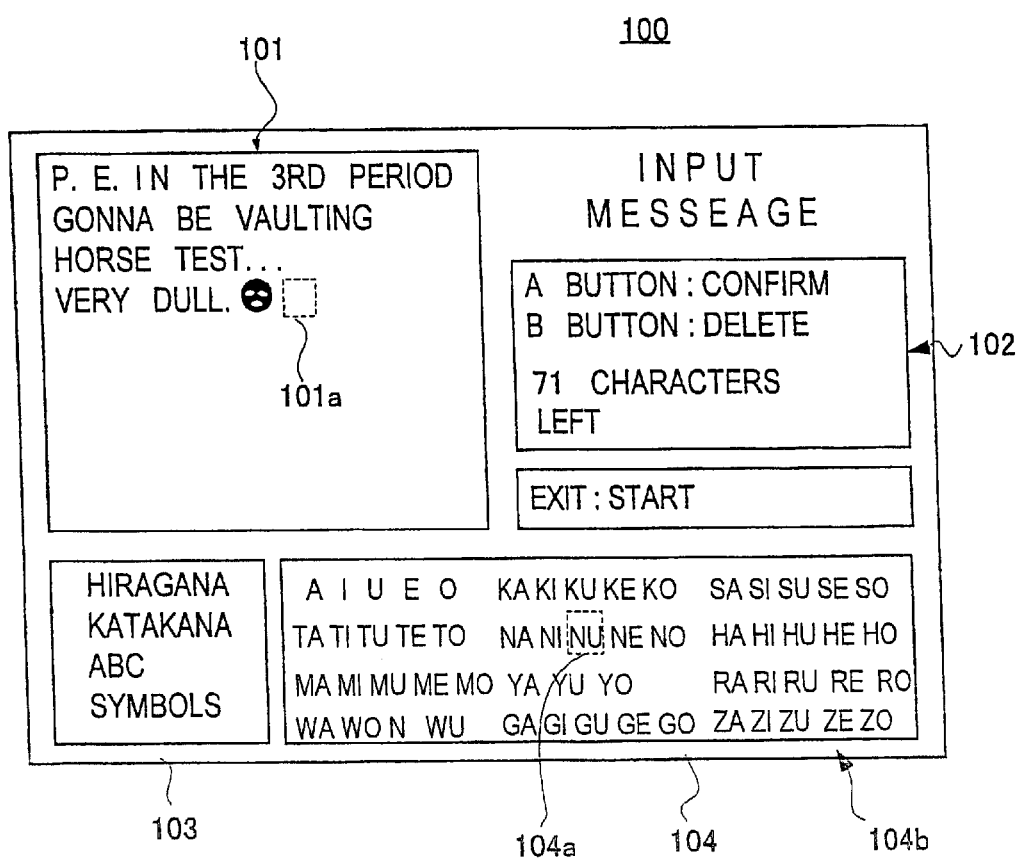
FIG. 4 is a view showing a screen for creating a message by the game machine of FIG. 1.
Figure 5:
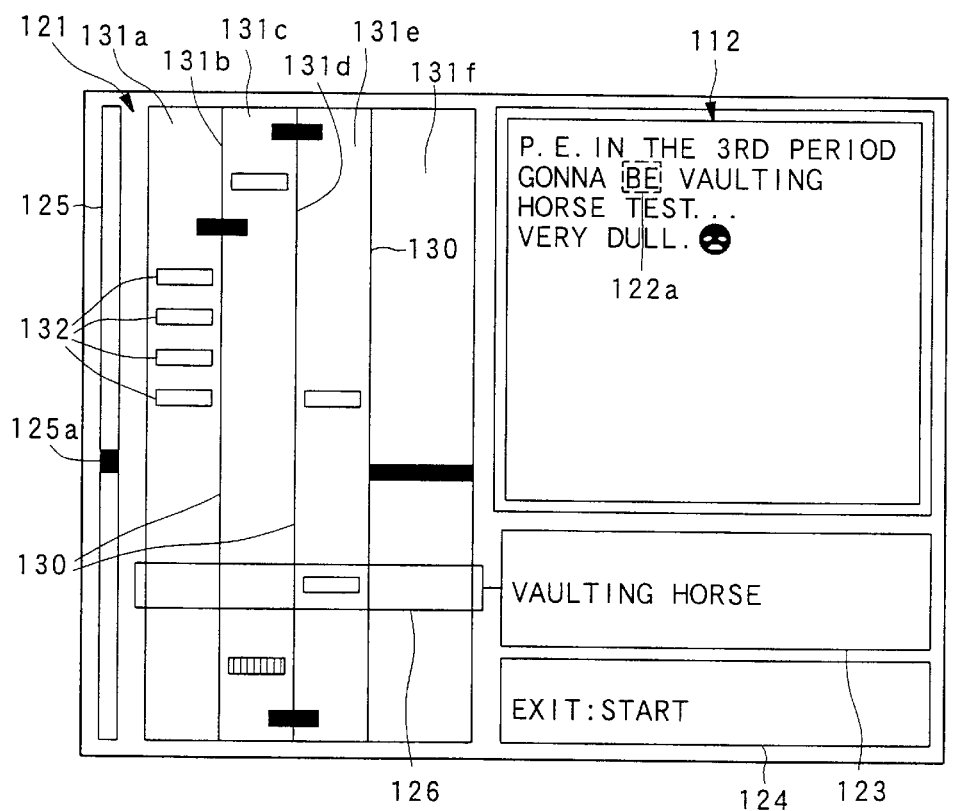
FIG. 5 is a view showing a screen for allocating each character of a message created by the game machine of FIG. 1 to an operation instruction mark of a music game to be performed by a receiving side game machine.
Figure 6:
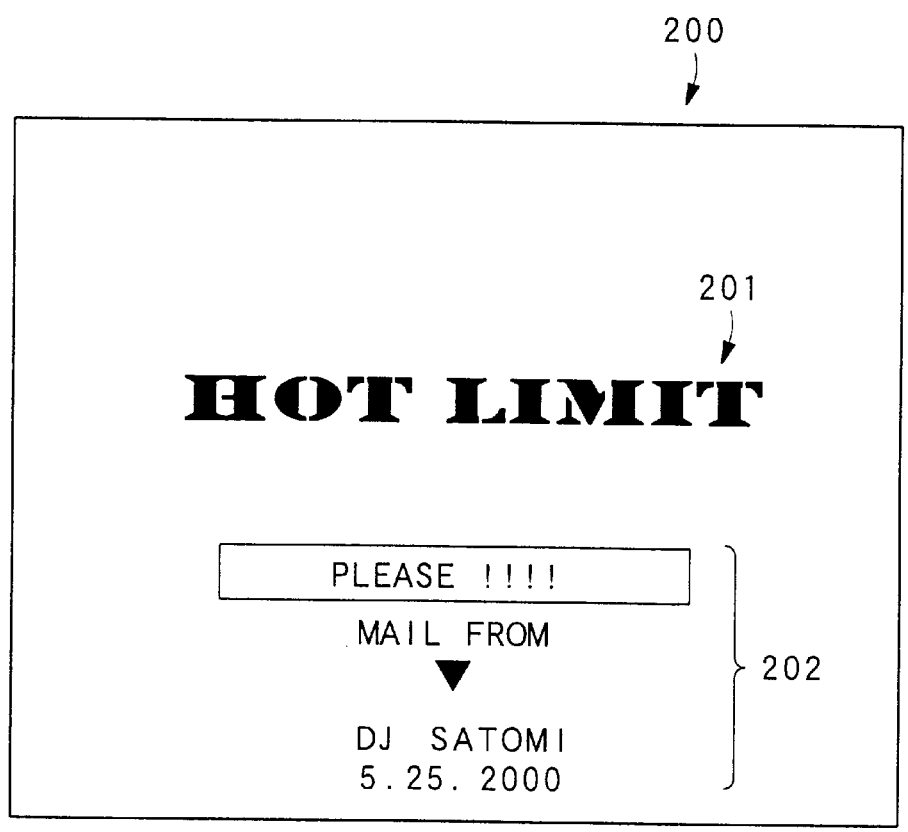
FIG. 6 is a view showing a title screen when a message is received by the game machine of FIG. 1.
Figure 8:
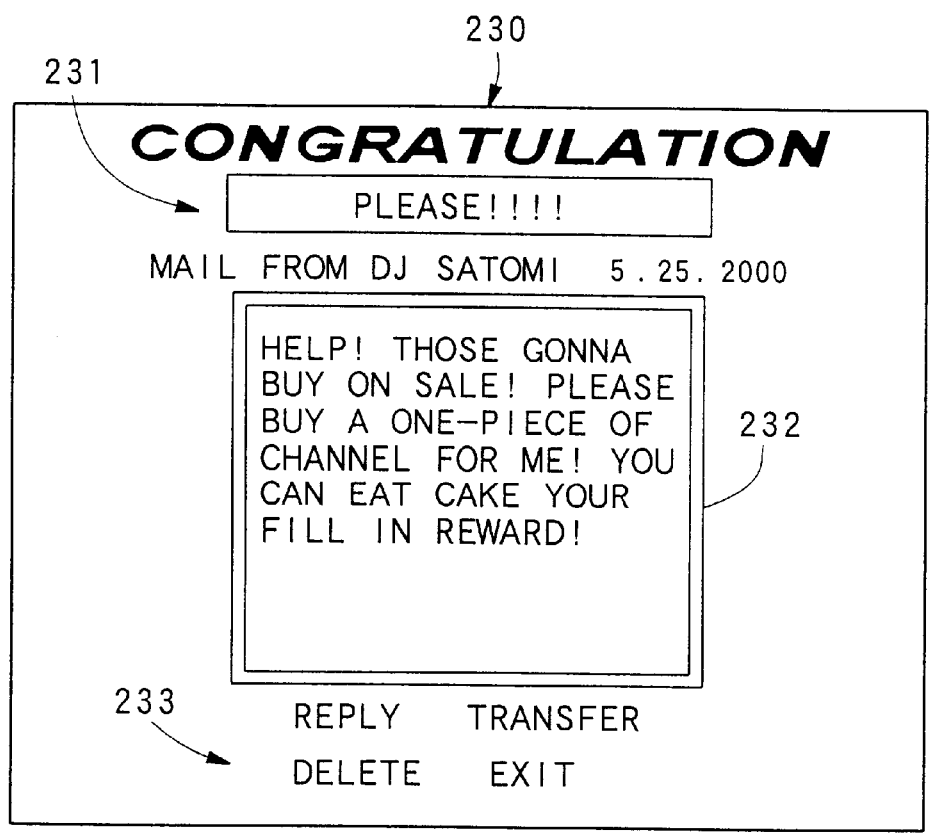
FIG. 8 is a view showing a screen displayed when a game to be played through the game screen of FIG. 7 is cleared.

Next, the message exchange function realized by a program recorded in the ROM 18 of the external storage apparatus 17 will be described referring to FIGS. 4 to 9. The message exchange function includes a function to be used for message sender and a function to be used for message receiver. The former includes further functions to create a message, set a reading condition and to transmit the message, while the latter includes functions to receive and display the message. FIGS. 4 and 5 show a representative screens displayed on the monitor 3 in case of message sender, while FIG. 6 to FIG. 8 show examples of representative screens displayed on the monitor 3 in case of message receiver. The message exchange function in the game machine 1 of this embodiment is characterized by that the receiver can read all characters of the received message only when the receiver has satisfied a predetermined condition in a music game performed by using a game screen 210 of FIG. 7. Therefore, first, functions to be used for reception shall be described referring to FIG. 6 to FIG. 8.

The message can be received by the user by connecting the game machine 1 to the server 34 and performing a predetermined download operation. Upon reception of message, a title screen 200 shown in FIG. 6 is displayed. The title screen 200 includes a music title display section 201 for displaying the title of the music to be played to open the received, message, and a message information section 201 for displaying the title, sender, transmission date and hour of the received message.

The game starts when the user performs a predetermined operation, and the game screen of FIG. 7(a) will be displayed. The game screen 210 includes indicator 211, sentence window 212, allocated character window 213, and achievement degree gage 214. The indicator 211 can be visually divided into six areas 221a to 221f with partition lines 220, namely areas 221a, 221c, 221e and 221f between partition lines 220 and areas 221b and 221d above the partition line 220. Respective areas 221a to 221f correspond to any one operation section of the input apparatus 4 of the game machine 1. For example, the area 221a corresponds to the left side of the direction indication switch 5, the area 221b to the upper side of the direction indication switch 5, the area 221c to the right side of the direction indication switch 5, the area 221d to the B button 6b, the area 221e to the A button, the area 221f to the START button 6c or SELECT button 6d.

When a game starts, the music displayed in the title screen 200 begins to be reproduced. After the beginning of playback, marks 222 . . . 222 appear at the upper edge of respective areas 221a to 221f of the indicator 211. The mark 222 appearance timing is predetermined for each music. The appeared marks 222 move downward in the indicator 211 with a speed corresponding to the tempo of the music. When the mark 222 arrives at the judgment reference line 223 at the lower edge of the indicator 211, it is the time to operate the operation section corresponding to the area 221a to 221f where that mark 222 is displayed (in the drawing, it is time to operate the A button 6a corresponding to the area 221e). The indicator 221's display area is limited, for example, to two measures of music. In other words, a judgment reference line 223 corresponds to the current position of the music, and the mark 222 corresponding to the operation to be executed within two measures from that position is displayed in the indicator 211.

When the user operates the input apparatus 4 according to the timing shown by the mark 222 and the judgment reference line 223, the degree of agreement between this operation timing and the one designated by the mark 222 is detected, and the user operation is evaluated, for example, in several levels, according to their degree of agreement. This evaluation is performed for each mark 222. The mark to which an evaluation equal or superior to a certain level is afforded is cleared. For example, the user operation levels are classified as "Great", "Good", "Bad" and "Poor" in the descendent order, and the mark judged to be "Great" or "Good" is treated as cleared. When the number of cleared mark 222 increases, the message will be displayed gradually more clearly in the sentence window 212. When a game starts, as shown in FIG. 7(b), the message displayed in the sentence window 212 is totally masked. An appropriate number of characters are allocated to the mark 222, and when the user clears a mark 222, only character strings to which the mark 222 is allocated are unmasked and displayed (FIG. 7(c)).

When all masks 222 to which character strings are allocated are cleared, as shown in FIG. 7(a), all masks will be removed and whole the message will be displayed in the sentence window 212. Here, the allocated character window 213 displays the character string allocated to the mark 222, when the mark 222 arriving at the judgment reference line 223 is cleared. The achievement gage 214 displays the degree of game achievement in bar graph format. More segments 214a are lighted up each time a certain number of marks 222 are cleared, and when all segments 214a up to the rightmost end of the gage 214 are turned on, the game is cleared (message display completion). The display of the achievement degree gage 214 may change in proportion to the unmasked message displayed in the sentence window 212.

The user can play the game repeatedly until whole the message is displayed. In the second play and thereafter, already cleared marks 222 are displayed in a form different from the other marks 222. For example, they are displayed in a color soberer than the other marks 222. Thereby, the user can distinguish obviously marks 222 to be cleared from those already cleared 222.

When the display of message is completed, the clear screen 230 of FIG. 8 is displayed. The clear screen 230 includes a message information section 231 showing the title, sender, transmission date and hour of the message, a sentence window 232 for showing the message text, and a menu display section 233 for displaying the processing menu. "Response" for using the creation function for responding to the message, "Transfer" for using the transfer function of message, "Delete" meaning message deletion and "EXIT" meaning the end of game are prepared in the menu display section 233; however, it can also be so composed to allow to select various functions available in an ordinary electronic mail software from the menu display section 233.

In order to permit to play as mentioned above, a group of data shown in FIG. 9(a) is recorded beforehand in the ROM 18 of the external storage apparatus 17. This group of data includes group of waveform data for music playback, group of waveform data for sound effect playback, group of data for operation instruction and group of image data. The group of waveform data for music playback is an ensemble of data describing the waveform for reproducing each one of a plurality of airs that can be used for the game. Preferably, the group of waveform data for music playback includes airs of a variety of genres so that music appropriate for the feeling of the user transmitting the message can be selected. The group of waveform data for sound effect playback is an ensemble of data describing respective waveforms of a plurality of sound effects to be pronounced according to the user operation during the game. The group of data for operation instruction is an ensemble of data for each piece of music defining a series of operations to the input apparatus 4 in accordance with the music. The display position or appearance timing of the mark 222 of the indicator 211, mentioned above, are decided based on the data for operation instruction for respective piece of music contained in this group of data for operation instruction. In other words, data for operation instruction is the data describing the distribution of marks 222 to be displayed in the indicator 211 from the beginning to the end of the music. The group of image data is an ensemble of data for displaying the mark 222 and the like.

On the other hand, as shown in FIG. 9(b), the message sent from the sender via the server 34 includes a message header containing title, sender, transmission date and hour or other information of the message, and the message text, and further, data for game is attached thereto. Data for game includes information to designate the music to be played for reading the message text, and allocation data designating the allocation of message character string for respective mark 222 displayed in the indicator 211 in correspondence to the music. Now, the function used to send message will be described referring to FIGS. 4 and 5.

FIG. 4 shows a screen displayed on the monitor 3 when a message is created. The message creation screen 100 includes a sentence window 101, an explanation window 102, a font menu 103 and a font window 104. The sentence window 101 displays a message (sentence) that the user is creating. The explanation window 102 displays operation procedures for message creation, error message, number of remaining characters that can be used, and others. The illustrated example shows that decision operation is allocated to the A button 6a, delete operation to the B button 6a and exit operation to the START button 6c respectively, and that 71 characters of the message are remaining. The font menu 103 shows the kind of fonts displayed in the font window 104 in the list format. Here, "hiragana", "katakana", "ABC" and "symbol" can be selected. The font window 104 shows the font that can be used actually for message creation.

The message creation operation using the screen 100 is as follows. When the user operates the SELECT button 6d, the operation object changes over sequentially among sentence window 101, font menu 103 and font window 104. When the sentence window 101 is to be operated, a cursor 101a shifts by one character vertically and horizontally according to the operation direction of the direction designation switch 5. When the font menu 103 is to be operated, any one of "hiragana", "katakana", "ABC" or "symbol" is selected as selection candidate by upward or downward operation of the direction designation switch 5. When the A button 6a is pressed, the font type selected at that moment is selected, and this selected font is displayed in the font window 104. When the font window 104 is to be operated, the cursor 104a shifts by one character according to the operation direction of the direction designation switch 5. When the cursor 104a is put on a character desired to be input, and the A button 6a is pressed, this character is input at the position indicated by the cursor 101a in the sentence window 101. When the B button 6b is pressed, the character indicated by the cursor 101a is deleted.

It may also be so composed that a desired character is input at the last end of the character string in the sentence window 101 and the cursor 101a shift to the input position of the following character, when the user shifts the cursor 104a on the character in the font window 104 by operating the direction designation switch 5 and, thereafter, pressing the A button 6a to confirm the character. Otherwise, the kind of font in the font menu 103 can be changed by shifting the cursor 104a in the font menu 103, and moving the cursor 104a vertically in the menu 103 by operating the direction designation switch 5 vertically. It may also be composed to return the cursor 101a by one character towards the head of sentence at the moment when the B button 6b is pressed during the presence of the cursor 104a in the font window 104, and to delete the character designated by the cursor 101a before the displacement.

The user can create a desired message following the aforementioned operations. Here, a scroll mark 104b is displayed in the font window 104. The scroll mark 104b is displayed when the font follows upward or downward in the window 104. An upward scroll mark is displayed when it continues upward, and a downward scroll mark when it continues downward. When the cursor 104a is at the lower most column of the window 104 and the direction designation switch 5 is operated downward, the display in the window 104 is scrolled upward, and the following font is displayed in the window 104. When the direction designation switch 5 is operated upward, the font is scrolled oppositely. The created message is stored in a predetermined work area in the RAM 13. As necessary, it can be stored in the memory 19 of the external storage apparatus 17.

FIG. 5 shows a screen displayed on the monitor 3 when the sender designates the correspondence between each character of the created message and marks 222 of FIG. 7. The music corresponding to the message is selected by the sending user, among airs contained in the group of waveform data for music playback in FIG. 9(a).

The window 120 of FIG. 5 contains indicator 121, sentence window 122, allocated character window 123 and explanation window 124. Similarly to the indication 211 of FIG. 7, the indicator 121 can be visually divided into six areas 131a to 131f with partition lines 130 . . . 130, namely areas 131a, 131c, 131e and 131f between partition lines 130 and areas 131b and 131d above the partition line 130.

The indicator 121 displays marks 132 . . . 132 specified by the data for operation instruction concerning the music selected by the sender by, for example, two measures of the music. The distribution of mark 132 from the beginning to the end of the music is identical to the distribution of marks 222 displayed in the indicator 211 when the receiver plays based on the game screen 210 of FIG. 7. The mark 132 is scrolled in the direction corresponding the operation, when the direction designation switch 5 is operated in the vertical direction, and accordingly, the cursor 125a of the scroll bar 125 moves vertically. The cursor 125a shows the corresponding position in the music of the range currently displayed in the indicator 121.

The indicator 121 displays the mark designation area 126. When the user operates the direction designation switch 5 to move a desired mark 132 to the area 126, this mark 132 is selected as an object of allocating the character string. In this status, when the SELECT button 6d is pressed, the operation object is changed to the sentence window 122. Thereafter, when the user operates the direction designation switch 5 to shift the cursor 122a to a desired character and presses the A button 6a, the character encircled by the cursor 122a at this moment is displayed in the allocation character window 123. Thereby, this character is allocated to the mark 132 in the area 126. When the user presses the B button 6b, the last character displayed in the allocation character window 123 is deleted, thereby the allocation of the deleted character to the mark 132 is canceled.

Up to 10 characters can be allocated to a single mark 132. However, when the first character is input into the allocation character window 123, the cursor 122 shifts automatically to the next character following that character, and the next allocation candidate is limited to the next character. In other words, when the first character to be allocated to the mark 132 is designated, thereafter, a character string following this character is designated sequentially by pressing the A button 6a. Here, each character can correspond to a plurality of marks 132. In other words, even a character string already allocated to any mark 132 can be allocated again by selecting another mark 132.

When a desired character string is allocated to one mark 132, the user presses again the SELECT button 6d to select the indicator 121 as operation object, and operates the direction designation switch 5 to shift the mark 132 to which the character string is allocated next to the area 126. Thereafter, the SELECT button 6d is pressed again to select the sentence window 122 as operation object, and similarly, thereafter, each character of the message is allocated to the mark 132 one after another. The mark 132 to which a character has already been allocated is displayed in a form different from the mark 132 not allocated. In the drawing, those marks 132 to which a character string is allocated are hatched; however, in the reality, they are displayed with their color or pattern changed. In addition, in the sentence window 122, the character which has already been allocated to any one mark 132 is displayed in a form different from those characters not allocated. For example, allocated characters are displayed in gray, and not allocated characters in white. This allows the user to distinguish easily not allocated characters. Besides, the explanation window 124 displays the work procedures, or the like.

Characters may be allocated by the following procedures. First, the indicator 121 is scrolled vertically by the vertical operation of the direction designation switch 5, to place the mark 132 to which a character is desired to be allocated in a mark designation area 126. In this state, when the A button 6a is pressed to perform the decision operation, the sentence windows 122 becomes active state (state selected as operation object), and the display form of the frame is modified. Next, the cursor 122a is shifted to the head of the character string to be allocated by operating the direction designation switch 5. In this state, the A button 6a is pressed, and then the cursor 122a is shifted to the end of the character string to be allocated, and the A button 6a is pressed. The character string to be allocated is designated by this, and the character string is displayed in the allocation character window 123. When the B button 6b is pressed while the sentence window 122 is active, the operation goes back to the precedent step. When the character string allocation is completed (status wherein the character string is displayed in the allocation character window 123), the indicator 121 becomes active automatically, and the next mark 132 can be selected. Characters are allocated to respective mark 132 by repeating the aforementioned procedures.

Figure 10:
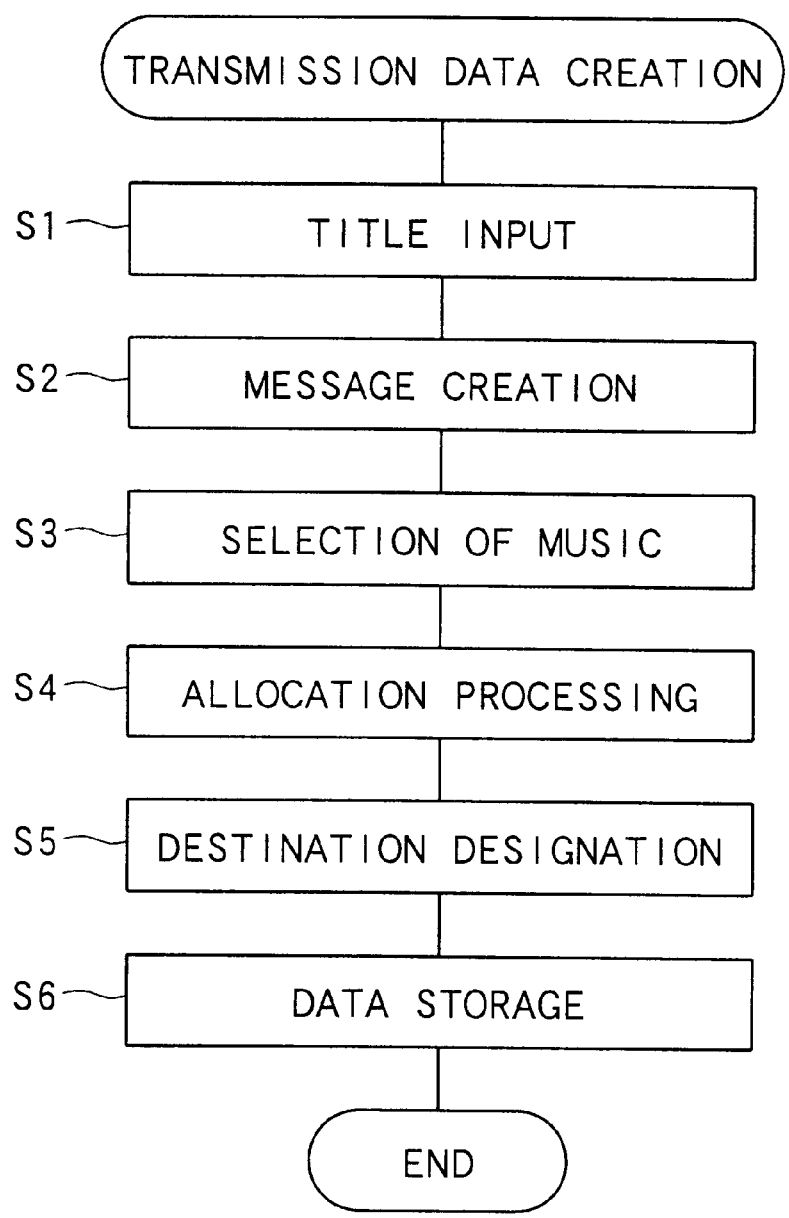
FIG. 10 is a flow chart showing the outline of procedures for creating a message by the game machine of FIG. 1.

Now, the processing performed by the CPU 11 during the aforementioned message transmission and reception is described referring to FIGS. 10 to 14. FIG. 10 is a flow chart showing the outline of the processing performed by the CPU 11 during the transmission data. (data shown in FIG. 9(b)) creation. When the user performs the operation to start the message creation, first, a process for making the user input the message title is performed (step S1). Then, the user is made to create a message using a screen 100 of FIG. 4 (step S2). When the message is created, the user is made to select music to be played to open the message (step S3). At this time, either music recorded in the group of waveform data for music playback of FIG. 9(a) can be selected as mentioned above.

Figure 11:
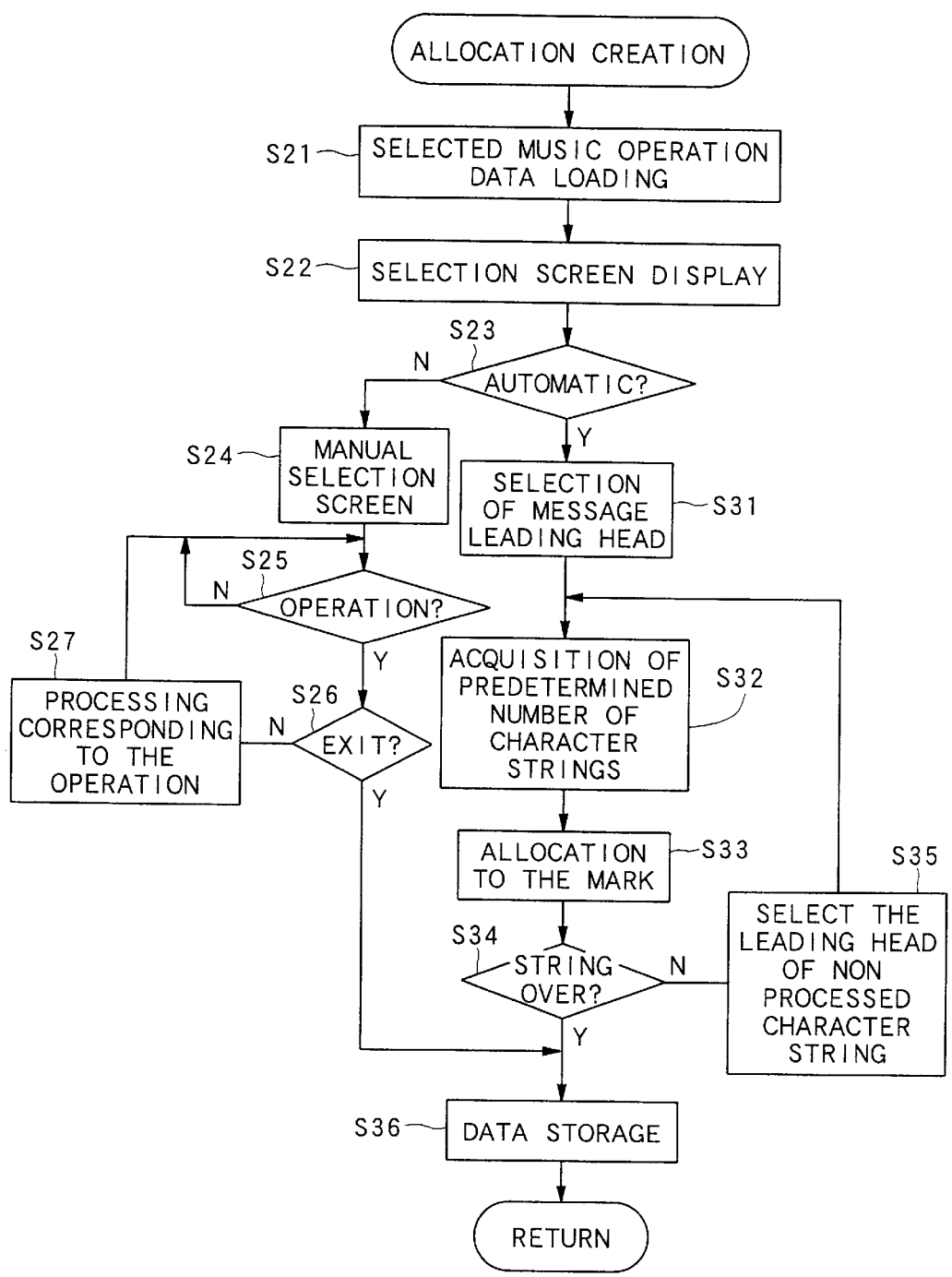
FIG. 11 is a flow chart showing a preferable processing performed for allocating each character of the message created by the game machine of FIG. 1 to the operation instruction mark of the music game to be performed by the receiving side game machine.

When music is selected, each character of the message is allocated to the mark of music (step S4). This processing can be performed by the user designating the character one by one using a screen 120 of FIG. 5, or by the processing of FIG. 11. FIG. 11 will be described below. When the character allocation is designated, the user is made to input the message destination (step S5). Thus, the transmission data creation of FIG. 9(b) is completed, the created transmission data is stored in a predetermined storage area of the RAM 13 (step S6), and thereby the processing of FIG. 10 is canceled.

FIG. 11 is a flow chart showing a preferred example of allocation processing executed in the step S4 of FIG. 4. This processing is characterized by that a mode wherein the character is allocated manually by the user using FIG. 5 and a mode wherein the allocation is decided automatically by the computer can be selected.

In this processing, first, from the group of operation instruction data of FIG. 9(a), data for operation instruction corresponding to the music selected by the user is loaded in the RAM 13 work area (step S21), then a screen for selecting either character automatic allocation mode or manual allocation mode by the user is displayed on the monitor 3 (step S22). Next, it is judged if the user has selected the automatic mode (step S23), and if the manual allocation mode is selected, a manual selection screen 120 of FIG. 5 is displayed on the monitor 3 (step S24). In the following step S25, it is judged whether or not any operation has been made to the input apparatus 4, and if there was any operation, it is judged if the allocation processing exit operation has been performed or not (step S26). If the exit operation is not performed, a processing corresponding to the operation detected in the step S25 is performed (step S27), and thereafter, the process goes back to the step S25. The processing corresponding to the operation performed in the step S26 is as described referring to FIG. 5. If it is judged to have exited in the step S26, the processing proceeds to the step S26.

If the automatic mode is selected in the step S23, the leading head character of the created message is selected as the allocation object (step S31). Then, a character string of a predetermined number (for example, 2 to 3 characters) from the allocation object character are further acquired as allocation object (step S32). Next, the acquired character string is allocated to any of marks defined by the operation instruction data loaded in the step S21 (step S33). In this case, marks can be selected at random, or in a fixed order.

Next, it is judged whether or not the allocation is completed for all characters string of the message (step S34), and if it is not the case, the leading head character string among unprocessed character strings is selected as allocation object (step S35). Thereafter, the processing goes back to the step S32.

If it is judged that the processing is completed for all character strings, the processing proceeds to the step S36. In the step S36, the allocation data (FIG. 9(b)) created as mentioned above is stored in a predetermined storage area of the RAM 13.

Figure 12:
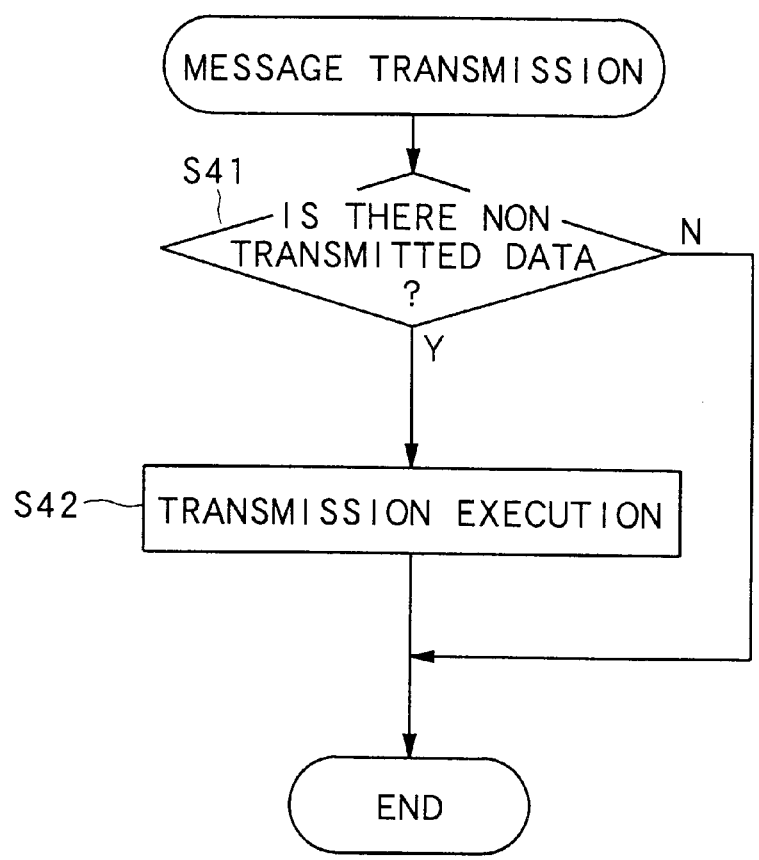
FIG. 12 is a flow chart showing a processing for transmitting the message from the game machine of FIG. 1.

The transmission data created by the processing of FIG. 10 is transmitted to the server 34 by the transmission processing of FIG. 12. This transmission processing is executed when the user designates to transmit the data by operating the input apparatus 4, and first, it is judged whether or not untransmitted data exists in the RAM 13 (step S41). If there is not, the processing is concluded, and if exists, the non-transmitted data is transmitted (step S42). In this processing, the transmission is performed following various procedures executed in an ordinary network transmission, including protocol establishment processing with a cellular phone 30, procedure for establishing the protocol with a network by calling an access point from the cellular phone 30, procedure for transmitting the transmission data to the server 34, and others. When the transmission of the transmission data is finished, the processing of FIG. 12 ends up.

Figure 13:
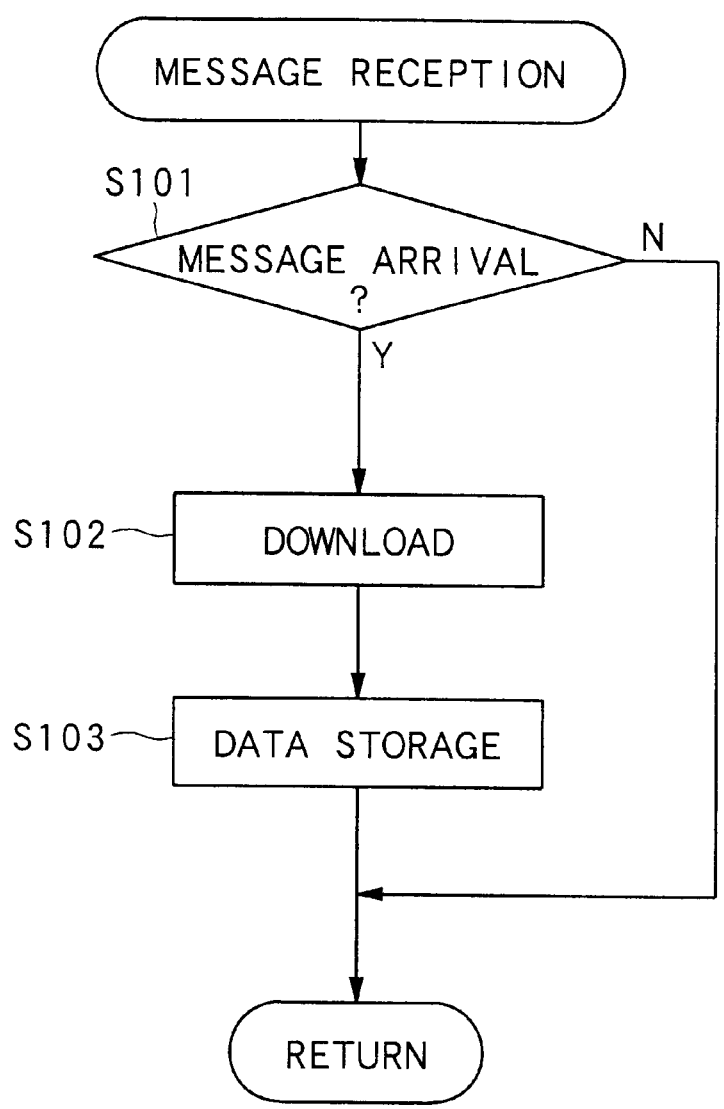
FIG. 13 is a flow chart showing a processing for receiving the message from the game machine of FIG. 1.

The message stored in the server 34 is transferred (download) to the reception side user's game machine 1 when the receiver performs a predetermined reception operation to the input apparatus 4. FIG. 13 shows the message reception processing at the reception side. In this processing, first, it is inquired to the server 34 whether or not a message is transmitted to itself, and it is judged whether or not a message has arrived by the answer from the server 34 (step S101). If no message has arrived, the following processing is cancelled to exit the reception processing. On the other hand, if a message has arrived, the download begins (step S102), when the download is completed, the transmission data is restored based on the download data stored in a temporary reception area of the RAM 13, and this is stored in a predetermined storage area of the RAM 13 (step S103). Thus completes the reception processing. When the reception is completed, the telephone line to the access point 32 is connected automatically. When a message has arrived, it may also composed to display only its header part information on the monitor 3, make the user select to download or not, and perform the step S102 and thereafter only for the message that the user has designated to download. The received data is stored in the memory 19 of the external storage apparatus 17 by the user's instruction.

FIG. 14 is a flow chart showing the procedure of game processing for the received message. This processing begins by the user designating the received message to be read. First, data necessary for game execution is loaded in a predetermined work area of the RAM 13 from the external storage apparatus 17 (step S111). In this case, the necessary data include waveform data for reproducing the music designated by the game data of the message, sound effect waveform data, data for operation instructions, image data, and others.

Next, the number of play times of the game concerning this message is identified (step S112). The number of play times is recorded in correspondence to the message, for example, in the RAM 13 or the memory 19 in the external storage apparatus 17. When a game is played for the first time after the reception, as there is no data of number of play times, the number of play times is identified as zero in the step S112. In the following step S113, 1 is added to the recorded value of number of play times. Then, after the addition, it is judged whether or not the number of play times is 4 or less (step S114), and a sound effect A is reproduced if it is 4 or less (step S115). On the other hand, if the number of play times exceeds 4, it is judged further whether or not the number of play times is 9 or less (step S116), and a sound effect B is reproduced if it is 9 or less (step S117). On the other hand, if the number of play times exceeds 9, the sound effect is not reproduced. The sound effect A is set to a simulation sound of a shout of joy from the audience, while the sound effect B to a simulation sound of an anxious murmur from the audience, respectively. This allows to change the reaction at the time of starting game according to the repeated number of times of the play before displaying a complete message, and strain those players of higher number of play times giving them a kind of pressure. The reaction of the game machine 1 to the repetition is not limited to the sound, but it may be changed by image in place of, or in addition to the sound.

In the following step S118, a game screen 210 of FIG. 7 is displayed. Thereafter, the music playback starts (step S119) and a calculation necessary for scrolling the mark 222 is performed (step S120). It is a processing for specifying a mark 222 newly appearing in the next frame from the operation instruction data and, at the same time, calculating the coordinates in the following frame of respective marks 222 already appeared. When the calculation for scrolling has finished, next, the user operation is evaluated (step S121). This processing consists in storing the operation of the input apparatus 4 from the processing time point of the previous step S121 to the current processing time point in a key buffer, and in evaluating the actual operation by the degree of agreement of the stored actual operation and the operation defined by the operation instruction data. However, the degree of agreement with the operation defined by the operation instruction data may be determined by interrupting each time when the input apparatus 4 is operated. An appropriate sound effect may be reproduced in response to the operation of the input apparatus 4.

In the following step S122, a mark 222 to which an evaluation equal or superior to a certain level is stored in the RAM 13 as cleared. Next, the degree of achievement of the game is calculated from the ratio of the number of cleared marks 222, and the total of marks 222 to which characters are allocated (step S123). Further, it is judged whether or not the degree of achievement has attained 100% (step S124) and, if it is not 100%, it is judged whether or not the music has reproduced up to a predetermined end position (step S125). If it is not the end, the screen display is refreshed in the step S126. At this time, in the sentence window 212, character strings corresponding to the cleared marks 222 are unmasked, those character strings are displayed in the allocation character window 213, and the indication of the achievement degree gage 214 is updated according to the calculation results of the step S123. Moreover, the position of the mark 222 of the indicator 211 is updated, and the indication form of cleared marks 222 is modified. After the processing of the step S126, the processing returns to the step S120.

If it is judged that the music has ended in the step S125, a predetermined screen showing game results is displayed on the monitor 3 in the step S127, and thereafter, the user is asked to confirm to discontinue the or not (step S127). If the discontinuance is not selected, the processing returns to the step S113, and if the discontinuance is selected, the game processing ends up. When the degree of achievement is judged to be 100% in the step S124, a clear screen 200 of FIG. 8 is displayed, thus completing the game processing.

The present invention in not limited to the aforementioned embodiment, but it may be realized in various embodiments. The character string was allocated to the mark 222 by the sender; however, the receiver side game machine 1 may allocate automatically to the received message. As for the message display permission, it may be judged to permit or not as the whole message in place of each character string based on the game situation. The game to be played to display the message is not limited to the music game, but various games such as dance game, shooting game, driving game, and roll playing game can be adopted, and conditions to permit the message display may be set in a variety of ways. For example, in the shooting game, the shooting target may be related to the character string, and it may be set to open the message progressively each time the target is hit.

The present invention is not limited to a system exchanging message between game machines 1, but the game may be played by taking in a message from other than the game machine 1. In this case, as the message does not contain game data of FIG. 9(b), an equivalent data may be created at the receiving game machine 1 side. The music may be decided conveniently using random numbers or the like, and as for the correspondence between the mark 222 and the character, the automatic mode described in FIG. 11 may be executed by the receiving side game machine 1.

As mentioned above, according to this invention, at least a part of received message is not displayed unless the message receiver plays a predetermined game and a predetermined condition is satisfied. This allows to add an entertainment to the message reading, and to enjoy exchanging message compared to the case of simple message exchange. Consequently, message can be exchanged taking the profits of functions proper to the game apparatus. In addition, even when a same game is repeated, message displayed as a result of playing is different each time, preventing the user from losing interest in the repetition of game, maintaining the charm of the game for a long time.

What is claimed is:

1. A game system comprising: a first game apparatus including a message creation device and a device for transmitting the created message; and a second game apparatus including a reception device of said message and a display control device for displaying the received message on a screen of a predetermined display apparatus, Wherein said second game apparatus includes a game execution device for making a user play a predetermined game, and a display permission control device for prohibiting to display at least a part of said message until a predetermined condition is met in said game, and permitting to display the prohibited part of said message when said condition is met.

2. The game system according to claim 1, wherein said display permission control device expands the display permitted range of said message as said game progresses.

3. The game system according to claim 1, wherein said second game apparatus comprises a music reproduction device for selecting and reproducing any one piece of music among a plurality of pieces of music prepared beforehand, said game execution device is composed to make the user play a game requiring an operation related to the piece of music to be reproduced by said music reproduction device, and said first game apparatus is provided with a music designation device for designating the piece of music to be reproduced by said music reproduction device of said second game apparatus in relation to said message.

4. The game system according to claim 1, wherein the game execution device of said second game apparatus comprises:

an operation instruction device showing a series of operations to an input device provided in said second game apparatus to the user through the screen of said display apparatus, based on operation instruction data prepared beforehand; and an evaluation device for evaluating each one of said series of operations, based on the level of agreement of each one of the series of operations instructed by said operation instruction device, and individual operation actually performed by the user to said input apparatus, a correspondence is established between each one of said series of operations and each character of said message, and said display permission control device permits to display the character corresponding to the operation to which an evaluation equal or superior to a predetermined level is afforded by said evaluation device, and prohibits to display the character corresponding to the operation to which an evaluation inferior to said predetermined level is afforded by said evaluation device.

5. The game system according to claim 4, wherein said first game apparatus is provided with a device for creating data designating the correspondence between each one of said series of operations and each character of said message, said message transmission device is capable of transmitting said data designating the correspondence along with said message, and said reception device of said second game apparatus can receive said data designating the correspondence along with said message.

6. The game system according to claim 5, wherein said device for creating data designating the correspondence comprises:

an operation selection device for selecting an operation as an object to be allocated with a character from each one of the series of operations defined by said operation instruction data, based on the instruction by said user; and an allocation character decision device for deciding at least one character to be allocated from said created message to the operation selected by said operation selection device based on the instruction by the user.

7. The game system according to claim 5, wherein said device for creating data designating the correspondence comprises:

a character extraction device for extracting automatically at least one character from said created message independently of the instruction by the user; and an operation selection device for selecting automatically an operation to which said extracted character is to be allocated from each one of the series of operations defined by said operation instruction data independently of the instruction by the user.

8. The game system according to claim 4, wherein said second game apparatus is provided with a device for creating data designating the correspondence between each one of said series of operations and each character of said message, said device for creating data designating the correspondence comprises:

a character extraction device for extracting automatically at least one character from said created message independently of the instruction by the user; and an operation selection device for selecting automatically an operation to which said extracted character is to be allocated from each one of the series of operations defined by said operation instruction data independently of the instruction by the user.

9. The game system according to claim 4, wherein said second game apparatus comprises a music reproduction device for selecting and reproducing any one piece of music among a plurality of pieces of music prepared beforehand, and operation instruction data is created individually for each one of said plurality of pieces of music.

10. The game system according to claim 9, wherein said first game apparatus is provided with a music designation device for designating the piece of music to be reproduced by said music reproduction device of said second game apparatus in relation to said message.

11. The game system according to claim 4, wherein said second game apparatus is capable of executing said game within a predetermined play range until said message becomes a predetermined display status, and in the second game and thereafter, said operation instruction device instructs to the user those operations to which an evaluation equal or superior to said predetermined level was afforded in the past game(s) and those operations to which an evaluation equal or superior to said predetermined level was not afforded in different forms.

12. The game system according to claim 1, wherein said second game apparatus allows to execute said game within a predetermined play range until said message becomes a predetermined display status.

13. A game apparatus capable of exchanging messages, comprising:

an input apparatus for outputting a signal corresponding to the user operation;

a display apparatus capable of displaying a predetermined game screen;

a reception device for receiving an external message;

a display control device for displaying the received message on the screen of said display apparatus;

a game execution, device for making a user play a predetermined game through said game screen; and a display permission control device for prohibiting to display at least a part of said message until a predetermined condition is met in said game, and permitting to display the prohibited part of said message when said condition is met.

14. The game apparatus according to claim 13, wherein said display permission control device expands the display permitted range of said message as said game progresses.

15. The game apparatus according to claim 13, further comprising a music reproduction device for selecting and reproducing any one piece of music among a plurality of pieces of music prepared beforehand, wherein said game execution device is composed to make the user play a game related to the piece of music to be reproduced by said music reproduction device, said reception device is capable of receiving information designating the piece of music to be reproduced by said music reproduction device in relation to said message, and said music reproduction device reproduces the piece of music designated in relation to the message, when a game corresponding to said received message is executed.

16. The game apparatus according to claim 13, wherein the game execution device comprises:

an operation instruction device showing a series of operations to an input device provided in said second game apparatus to the user through the screen of said display apparatus, based on operation instruction data prepared beforehand;

an evaluation device for evaluating each one of said series of operations, based on the level of matching of each one of the series of operations instructed by said operation instruction device, and individual operation actually performed by the user to said input apparatus, a correspondence is established between each one of said series of operations and each character of said message, and said display permission control device permits to display the character corresponding to the operation to which an evaluation equal or superior to said predetermined level is afforded by said evaluation device, and prohibits to display the character corresponding to the operation to which an evaluation inferior to said predetermined level is afforded by said evaluation device.

17. The game apparatus according to claim 16, wherein said reception device is capable of receiving said data designating the correspondence between each one of said series of operations and each character of said message from outside along with said message, and said display permission control device controls permission and prohibition of said display based on the data designating said correspondence.

18. The game apparatus according to claim 16, comprising as a device for creating data designating the correspondence between each one of said series of operations and each character of said message:

a character extraction device for extracting automatically at least one character from said received message independently of the instruction by the user; and an operation selection device for selecting automatically an operation to which said extracted character is to be allocated from each one of the series of operations defined by said operation instruction data independently of the instruction by the user.

19. The game apparatus according to claim 16, wherein said game is capable of being executed within a predetermined play range until said message becomes a predetermined display status, and in the second game and thereafter, said operation instruction device instructs to the user those operations to which an evaluation equal or superior to said predetermined level was afforded in the past games and those operations to which an evaluation equal or superior to said predetermined level was not afforded in different forms.

20. The game apparatus according to claim 13, wherein said game is capable of being executed within a predetermined play range until said message becomes a predetermined display status.

21. A message exchange system, comprising:
a first terminal apparatus including a device for creating a message and a device for transmitting the created message; and
a second terminal apparatus including a reception device of said message and a display control device for displaying the received message on the screen of a predetermined display apparatus,
wherein said second terminal apparatus includes a game execution device for making a user play a predetermined game, and a display permission control device for prohibiting to display at least a part of said message until a predetermined condition is met in said game, and permitting to display the prohibited part of said message when said condition is met.

22. A computer readable storage medium storing a program for making a computer provided in a game apparatus function as:
a reception device for receiving an external message;
a display control device for displaying the received message on the screen of a predetermined display apparatus;
a game execution device for making a user play a predetermined game through the screen of said display apparatus; and
a display permission control device for prohibiting to display at least a part of said message until a predetermined condition is met in said game, and permitting to display the prohibited part of said message when said condition is met.

23. The storage medium according to claim 22, wherein said display permission control device expands the display permitted range of said message as said game progresses.

24. The storage medium according to claim 22, wherein
said program is composed to make said computer function as a device for selecting any one piece of music among a plurality of pieces of music prepared beforehand and making it reproduced by a reproduction apparatus of the game apparatus,
said game execution device is composed to make the user execute an operation related to the piece of music to be reproduced by said reproduction apparatus,
said reception device is capable of receiving information designating the piece of music to be reproduced by said music reproduction device in relation to said message along with said message, and
said device for reproducing makes the piece of music designated in relation to the message be reproduced, when a game corresponding to said received message is executed.

25. The storage medium according to claim 22, wherein the game execution device comprises:
an operation instruction device showing a series of operations to said input device to the user through the screen of said display apparatus, based on operation instruction data prepared beforehand; and
an evaluation device for evaluating each one of said series of operations, based on the level of agreement of each one of the series of operations instructed by said operation instruction device, and individual operations actually performed by the user to said input apparatus,
a correspondence is established between each one of said series of operations and each character of said message, and
said display permission control device permits to display the character corresponding to the operation to which an evaluation equal or superior to said predetermined level is afforded by said evaluation device, and prohibits to display the character corresponding to the operation to which an evaluation inferior to said predetermined level is afforded by said evaluation device.

26. The storage medium according to claim 25, wherein said reception device is capable of receiving said data designating the correspondence between each one of said series of operations and each character of said message from outside along with said message, and said display permission control device controls permission and prohibition of said display based on the data designating said correspondence.

27. The storage medium according to claim 25, wherein said program is composed to make said computer function as a device for creating data designating the correspondence between each one of said series of operations and each character of said message, said device for creating data comprises:
a character extraction device for extracting automatically at least one character from said created message independently of the instruction by the user; and
an operation selection device for selecting automatically an operation to which said extracted character is to be allocated from each one of the series of operations defined by said operation instruction data independently of the instruction by the user.

28. The storage medium according to claim 25, wherein said program is composed to permit repetitive play of said game within a predetermined play range until said message becomes a predetermined display status, and in the second game and thereafter, said operation instruction device instructs to the user those operations to which an evaluation equal or superior to said predetermined level was afforded in the past games and those operations to which an evaluation equal or superior to said predetermined level was not afforded in different forms.

29. The storage medium according to claim 22, wherein said program is composed to permit repetitive play of said game within a predetermined play range until said message becomes a predetermined display status.

30. A computer readable storage medium storing respectively a program for making a computer provided in a game apparatus function as a message transmission apparatus, and a program for making the computer function as a reception apparatus for receiving said external message, wherein said program for making said computer function as a transmission apparatus is composed to make the computer function as a message creation device and a device for transmitting the created message respectively, and said program for making said computer function as a receiving apparatus is composed to make said computer function as:
a reception device for receiving an external message;
a display control device for displaying the received message on the screen of a predetermined display apparatus;
a game execution device for making a user play a predetermined game through the screen of said display apparatus; and
a display permission control device for prohibiting to display at least a part of said message until a predetermined condition is met in said game, and permitting to display the prohibited part of said message when said condition is met.

* * * * *